(12) United States Patent
Widener et al.

(10) Patent No.: US 6,288,864 B1
(45) Date of Patent: Sep. 11, 2001

(54) CALIBRATION OF MAGNETIC TAPE DRIVE

(75) Inventors: William Widener, Louisville; Timothy C. Hughes, Boulder, both of CO (US)

(73) Assignee: Exabyte Corporation, Boulder, CO (US)

( * ) Notice: Subject to any disclaimer, the term of this patent is extended or adjusted under 35 U.S.C. 154(b) by 0 days.

(21) Appl. No.: 08/867,416

(22) Filed: Jun. 2, 1997

(51) Int. Cl.$^7$ ............................. G11B 5/584; G11B 15/61
(52) U.S. Cl. ................................. 360/77.13; 360/130.23
(58) Field of Search .................... 360/77.13, 71, 360/130.23; 386/78, 79

(56) References Cited

U.S. PATENT DOCUMENTS

| | | |
|---|---|---|
| 5,027,231 * | 6/1991 | Fell ........................................ 360/71 |
| 5,065,261 | 11/1991 | Hughes et al. . |
| 5,680,269 | 10/1997 | Georgis et al. . |
| 5,822,491 * | 10/1998 | Sasaki et al. ................. 360/77.01 X |

\* cited by examiner

*Primary Examiner*—Andrew L. Sniezek
*Assistant Examiner*—James L Habermehl
(74) *Attorney, Agent, or Firm*—Nixon & Vanderhye P.C.

(57) ABSTRACT

In a method of calibrating a helical scan magnetic tape drive, a dual scan calibration tape having a calibration stripe is loaded into the tape drive. As a head traverses differing paths along the calibration stripe, a series of calibration signal waveforms is obtained. For each calibration signal waveform in the series, a voltage measurement is made at a predetermined position within each waveform. A maximum one of the voltage measurements is used to generate a measured overlap scale factor (MOV) indicative of an overlap of the read head relative to the calibration stripe. As a subsequent calibration stripe on the calibration tape is read in a dual scan calibration mode, the measured overlap scale factor is utilized to generate a track position error vector. The track position error vector is used to adjust a tape path guide of the tape drive.

13 Claims, 10 Drawing Sheets

CALIBRATION OF MAGNETIC TAPE DRIVE

BACKGROUND

1. Field of Invention

This invention pertains to the calibration of magnetic tape drives.

2. Related Art and Other Considerations

In magnetic tape drives, magnetic tape is transported past a head unit whereon at least one, and usually both, of a write head and a read head are mounted. As the tape is transported past the head unit, the heads are employed to transduce information with respect to the tape. In a recording mode, the write head records tracks on the tape. Conversely, in a read or reproduction mode, tracks previously recorded on the tape are read.

Two types of magnetic tape drives are serpentine tape drives and helical scan tape drives. In serpentine tape drives, elongated tracks are recorded parallel to the direction of tape transport, e.g., along the major dimension of the tape, typically from a first end of the tape to a second end of the tape. In helical scan tape drives, the head unit is mounted on a rotating drum around which the tape is partially wrapped at a predetermined angle. In view of the geometry, helical tracks are stripes are recorded and read by the helical scan tape drive.

In magnetic tape drives, the tape is typically housed in a cartridge. In some tape drives, such as the helical scan drives, a portion of the tape is extracted from the cartridge into a tape path for operative encounter with the head unit. In other drives, upon opening of a cartridge lid or the like, a tape path is formed in which the head unit operatively encounters the tape. In either case, the tape path of the tape drive typically includes one or more tape guiding elements for properly guiding and aligning the tape as the tape is in transit toward the head unit.

A typical tape guide element 700 shown in FIG. 7A and FIG. 7B has the shape of a spool, Guide element 700 has upper and lower edge flanges 702, 704 and a rotating, barrel-like midsection 706, all concentrically positioned about a mounting pin 708. The top of mounting pin 708 is threaded for engagement with interior threads on upper edge flange 702. An expansion spring 710 is retained between a deck of the tape drive and an underside of lower edge flange 704.

Tape T is guided between upper flange 702 and lower flange 704 in the manner shown in FIG. 7A. To accommodate linear transport of tape T, guide midsection 706 rotates about bearing 712. Bearing 712 and edge flanges 702, 704 are movable along the vertical direction as depicted by arrow 720. However, the precise vertical position of guide member 700, and thus of tape T, is adjusted and retained by upper edge flange 702. By rotation of upper edge flange 702 about the threaded top end of mounting pin 708, the tape T can be set to a proper vertical height for feeding of tape T toward the head unit.

The vertical height for guide elements such as guide 700 of FIG. 7A must be calibrated for a tape drive, e.g., upon manufacture and for maintenance of the tape drive. To this end, tape drive manufacturers have long used "master alignment tapes" for the spatial adjustment of the tape guide elements of the tape path in order to locate the position of the tape relative to the head unit, e.g. the rotating drum or scanner in a helical scan recorder rotary head device. The master alignment tapes are prepared on a well-calibrated tape drive and then removed therefrom. The master alignment tape is then inserted into a tape drive to be adjusted, e.g., a just-manufactured tape drive, and read by the adjusted tape drive. From the readback signals of a master alignment tape acquired from the tested tape drive, the technician (or robot) makes the available spatial guide adjustments of the guide elements of the adjusted tape drive until a desired readback waveform is achieved (or nearly achieved).

The overall accuracy of the master alignment tape approach depends on how the master alignment tape is constructed and how it is used. In this regard, the spatial information about the relationship between the master alignment tape and the head unit is derived from the readback signal amplitudes. Any other factors causing fluctuations in readback signal amplitudes (i.e., inconsistent head-tape contact) may influence the results.

Tape drive manufacturers traditionally employ "single-scan" master alignment tapes. A "single-scan master alignment tape" for a helical scan drive has a series of tracks written by only one write head using substantially the native (+1X) linear tape speed and drum RPM. Single-scan master alignment tapes are read only by one read head of a tape drive, even if the tape drive has a plurality of read heads. The read head which actually reads the master alignment tape is herein called the "activated" read head. As the name implies, in the "single-scan" method each track written on the master alignment tape is scanned only once by the corresponding read head of the tape drive undergoing adjustment. To eliminate read head width effects and recorded track width effects from the readback signal amplitude, the pattern of read head paths is intentionally offset so that each read head path only partially overlaps each track recorded on the master alignment tape.

Assuming that the head-tape contact is perfectly consistent throughout the read head scan, variation in the peak readback signal amplitude (during the on-tape scan) is directly related to the variation in the spatial overlap between the read head path and the recorded track of the master alignment tape. Typically, the voltage waveforms from many on-tape read scans are averaged together to improve signal to noise ratio (SNR). Generally, the technician (or robot) adjusts the tape drive's tape guiding elements, e.g. as explained above, to minimize any variation in the peak readback signal amplitude. This necessarily implies that the read head path shape matches the recorded track shape of the master alignment tape.

If the read head-to-tape contact is not perfectly consistent throughout the scan, the single-scan method will result in a misadjustment of the tape drive in order to compensate for the poor head-tape contact. For example, if poor head-tape contact results in a loss of peak readback signal amplitude only near the start of scan region, the drive will be adjusted so that the read head path overlaps more of the recorded track in this area to compensate for the signal loss due to poor head-tape contact. Although the desired peak readback signal amplitude/shape is achieved, the drive's spatial alignment does not match the master alignment tape since the overlap is not consistent.

To solve the problems of the single-scan method, a dual-scan master calibration tape and method of usage therefor is disclosed in U.S. patent application Ser. No. 08/841,597, filed Apr. 30, 1997 by Magnusson, entitled "PREPARATION AND USAGE OF DUAL-SCAN MASTER CALIBRATION TAPE FOR MAGNETIC TAPE DRIVE", which is incorporated herein by reference. The dual-scan master calibration tape is generated by transporting the master calibration tape past a rotating drum whereon a write head is mounted and activating the write head only during every other rotation of the drum. In use, the dual-scan master calibration tape is transported past a read head in a manner whereby, for a track pre-recorded on the master calibration tape, the read head separately follows a first path over a bottom longitudinal edge portion of the track and a second path over a top longitudinal edge portion of the same track. A first path read signal is generated as the read head follows the first (bottom longitudinal edge) path over the track; a second path read signal is generated as the read head follows the second (top longitudinal edge) path over the track. Both the first path read signal and the second path read signal are used to determine a calibration indicia for the tape drive. In some embodiments, the dual master calibration tape is written at a non-native linear tape speed and is transported past the read head at a non-native linear tape speed.

In order to abate noise influences and improve the signal to noise ratio of the measurements, in actuality many first path read signals are averaged together and many second path read signals are averaged together before determining the calibration indicia for the tape drive. However, when making use of relative inexpensive instrumentation, an inconvenient number of signals are required for such averaging to provide near real-time feedback for adjustments.

What is needed therefore, and an object of the present invention, is a calibration method for a tape drive which is relatively expeditious and for which extensive signal averaging is not required.

SUMMARY

In a method of calibrating a helical scan magnetic tape drive, a dual scan calibration tape having a calibration stripe is loaded into the tape drive. As a head traverses differing paths along the calibration stripe, a series of calibration signal waveforms is obtained. For each calibration signal waveform in the series, a voltage measurement is made at a predetermined position within each waveform. A maximum one of the voltage measurements is used to generate a measured overlap scale factor (MOV) indicative of an overlap of the read head relative to the calibration stripe.

After determination of the measured overlap scale factor (MOV), a subsequent calibration stripe on the calibration tape is read in a dual scan calibration mode. The subsequent calibration stripe is scanned twice, first along its bottom to obtain an "B" waveform and secondly along its top to obtain an "A" waveform. The waveform values, known as $A_{meas\text{-}voltage}$ and $B_{meas\text{-}voltage}$, respectively, are then utilized to determine a track position error vector E, which is in microns. The track position error vector E is determined as follows:

$$E=(A_{drive\text{-}microns}-B_{drive\text{-}microns})/2$$

where $$A_{drive\text{-}microns}=A_{meas\text{-}voltage}*(MOV)-A_{precited\text{-}microns}$$

and $$B_{drive\text{-}microns}=B_{meas\text{-}voltage}*(MOV)-B_{precited\text{-}microns}$$

The track position error vector E is then used to adjust a tape path guide of the tape drive.

In one mode of the invention, the calibration tape has essentially no linear velocity in the tape drive while the calibration stripe is read to determine the measured overlap scale factor (MOV). In such mode, the differing paths along the calibration stripe are realized by periodically stepping the calibration tape a predetermined distance in a linear direction in the tape path. In another mode, a slow creeping linear velocity is imparted to the calibration tape for realizing the differing paths for obtaining the the measured overlap scale factor (MOV).

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION OF THE DRAWINGS

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail.

Figure 1:
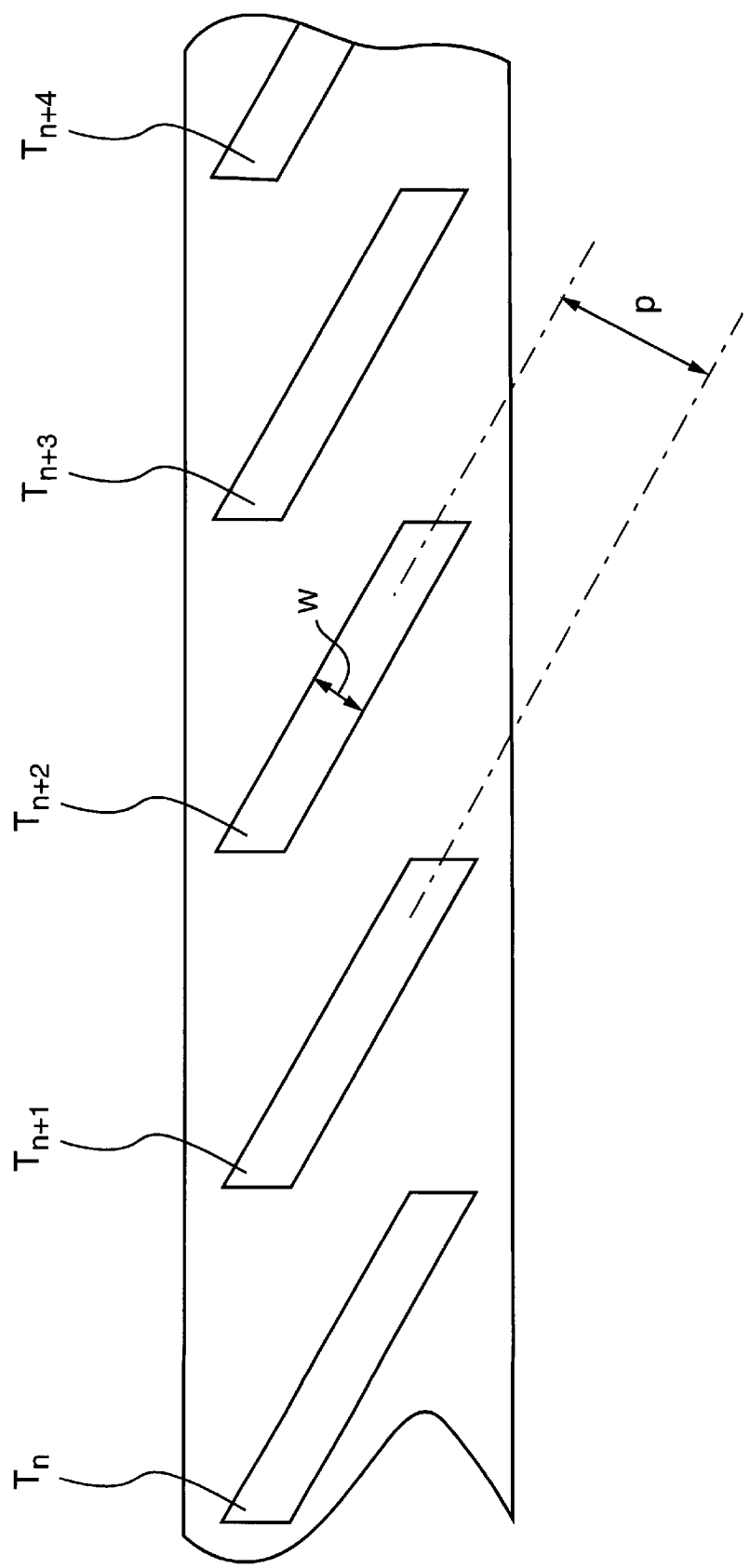
FIG. 1 is a diagrammatic view of an embodiment of a dual-scan master calibration tape format for a tape drive utilized in accordance with the present invention.

The present invention utilizes a dual-scan master alignment tape prepared in accordance with U.S. patent application Ser. No. 08/841,579, filed Apr. 30, 1997 by Magnusson, entitled "PREPARATION AND USAGE OF DUAL-SCAN MASTER CALIBRATION TAPE FOR MAGNETIC TAPE DRIVE", which is incorporated herein by reference. One example of such a dual-scan calibration tape is illustrated as tape 10 in FIG. 1. Calibration tape 10 has a series of tracks $T_n$, $T_{n+1}$, $T_{+2}$, . . . , which are recorded to have a predetermined width W and predetermined pitch P. Tape 10 has the series of tracks $T_n$, $T_{n+1}$, $T_{n+2}$, . . . written by only one write head of a calibration tape-generating drive/machine using a newly selected linear tape speed, $V_T{}'$, (which may or may not be equal to the native +1X linear tape speed, $V_T$) and the nominal (+1X) scanner RPM. The sole activated write head of the calibration tape-generating drive/machine records one track every other scanner revolution.

Figure 5:
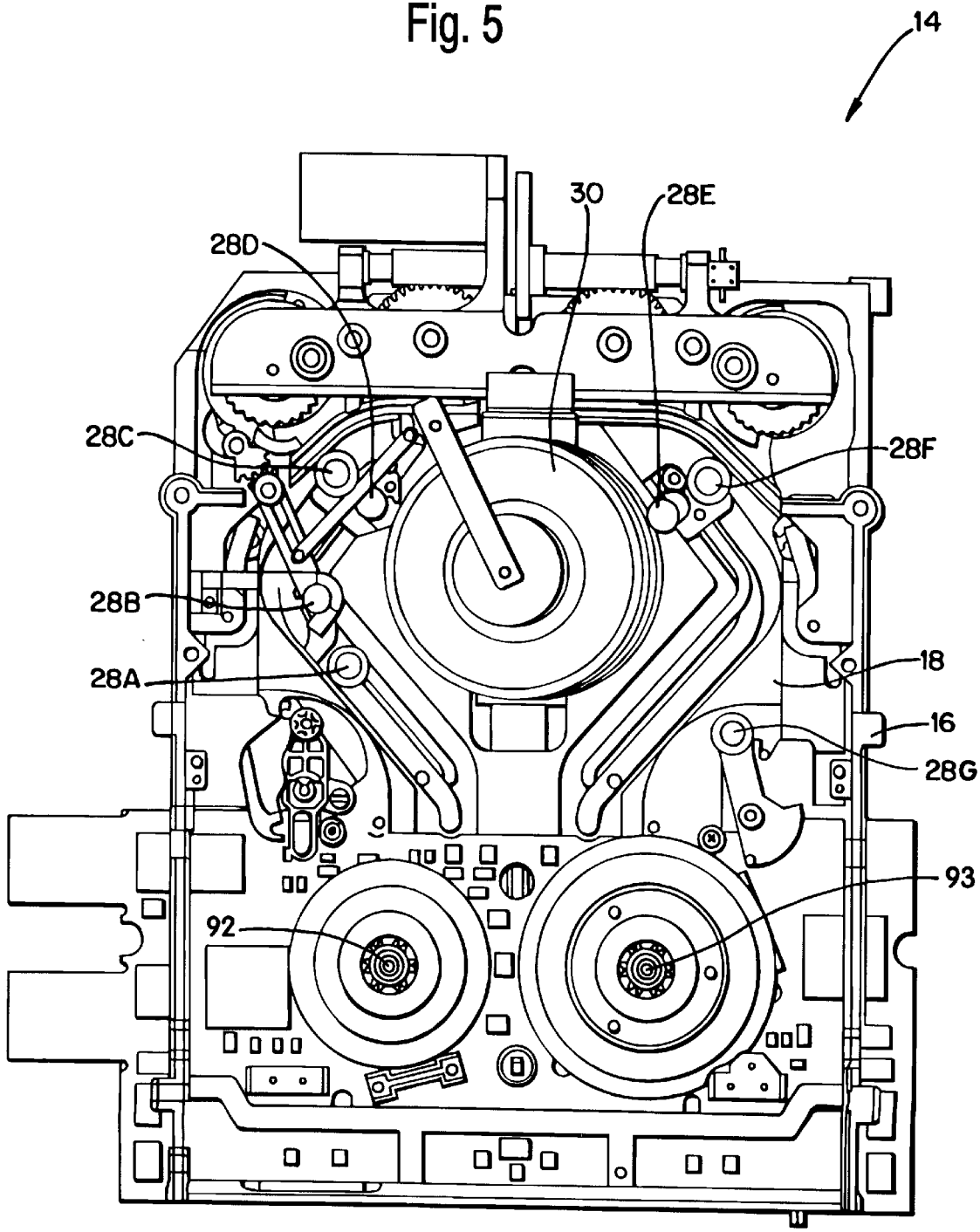
FIG. 5 is a top view of a tape drive.
Figure 6:
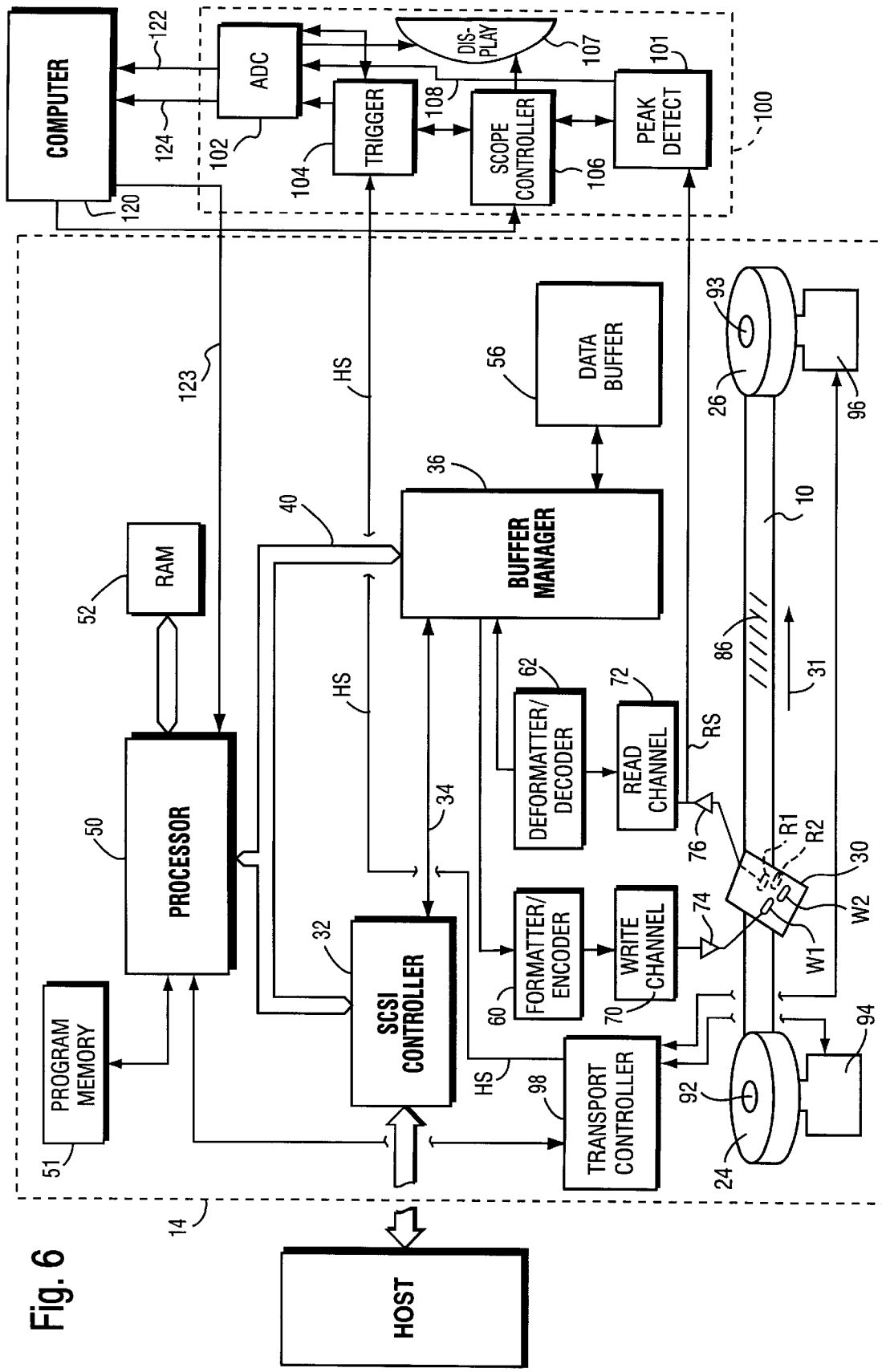
FIG. 6 is a schematic view of electronics included in the tape drive of FIG. 5.

FIG. 5 schematically shows a helical scan tape drive 14 which can depicts a drive which is to be calibrated or adjusted using the master calibration or alignment tape 10 of the present invention. Helical scan drive 14 includes a drive frame 16 and a deck floor 18. As shown in FIG. 6, a magnetic tape (such as an 8 mm magnetic tape, for example) has a first end wound around a supply reel 24 and a second end wound around a take-up reel 26. The path traversed by the tape is defined at least in part by a series of tape guide elements 28A–28G and a rotating scanner or drum 30. Tape guides 28 and drum 30 are ultimately mounted on deck floor 18. In all operations excepting a rewind operation, the tape travels from supply reel 24 to take-up reel 26 in the direction depicted by arrow 31.

As shown in FIG. 6, drum 30 has read heads R1 and R2 as well as write heads W1 and W2 mounted on the circumference thereof. As drum 30 rotates, at any moment a portion of its circumference is in contact with traveling tape. Other structural details of tape drive 14 are understood e.g., from U.S. Pat. No. 5,602,694 to Miles et al., which is incorporated herein by reference.

Tape drive 14 includes a SCSI controller 32 which is connected by data bus 34 to buffer manager 36. Both SCSI controller 32 and buffer manager are connected by a bus system 40 to processor 50. Processor 50 is also connected to program memory 51 and to a data memory, particularly RAM 52.

Buffer manager 36 controls, e.g., both storage of user data in buffer memory 56 and retrieval of user data from buffer memory 56. User data is data from a host for recording on tape or destined from tape to the host. Buffer manager 36 is also connected to formatter/encoder 60 and to deformatter/decoder 62. Formatter/encoder 60 and deformatter/decoder 62 are, in turn, respectively connected to write channel 70 and read channel 72. Write channel 70 is connected via write amplifier 74 to recording element(s) or write head(s) W1, W2; read channel is connected via read amplifier 76 to read element(s) or read head(s) R1, R2.

Those skilled in the art will appreciate that write channel 70 includes various circuits and elements including a RLL modulator, a parallel-to-serial converter, and write current modulator. Similarly, the person skilled in the art understands that read channel 72 includes a data pattern and clock recovery circuitry, a serial-to-parallel converter, and, an RLL demodulator. These and other aspects of tape drive 30, including servoing, error correction, etc., are not necessary for an understanding of the invention and accordingly are not specifically described herein.

Write head(s) W1, W2 and read head(s) R1, R2 are situated on a peripheral surface of rotating drum 30. Tape 10 is wrapped around drum 30 such that head(s) W1, W2 and R1, R2 follow helical stripes 86 on tape 10 as tape 10 is transported in a direction indicated by arrow 31 from a supply reel 24 to a take-up reel 26. Supply reel 24 and take-up reel 26 are typically housed in an unillustrated cartridge or cassette from which tape 10 is extracted into a tape path that includes wrapping around drum 30. Supply reel 24 and take-up reel 26 are driven by respective reel spindles 92, 93 which are rotated by respective reel motors 94 and 96 for transport tape 10 in the direction 31. Reel motors 94 and 96 are controlled by transport controller 98, which ultimately is governed by processor 50. Operation and control of the tape transport mechanism including reel motors 94 and 96 is understood by the person skilled in the art with reference, for example, to U.S. Pat. No. 5,680,269, METHOD AND APPARATUS FOR CONTROLLING MEDIA LINEAR SPEED IN A HELICAL SCAN RECORDER, filed Nov. 10, 1994 and incorporated herein by reference.

In utilizing the dual-scan master calibration tape 10 in a tape drive to be adjusted, one read head (e.g., read head R1) is utilized to read the tracks recorded on tape 10. The tape drive is operated so that read head R1 reads a calibration track a plurality of times, each time following a differing path, in the manner depicted in FIG. 8. For at least selected traversals of the head, the signal read from read head R1 is obtained on line RS. The value of the signal on RS is applied to waveform reading machinery.

Figure 8:
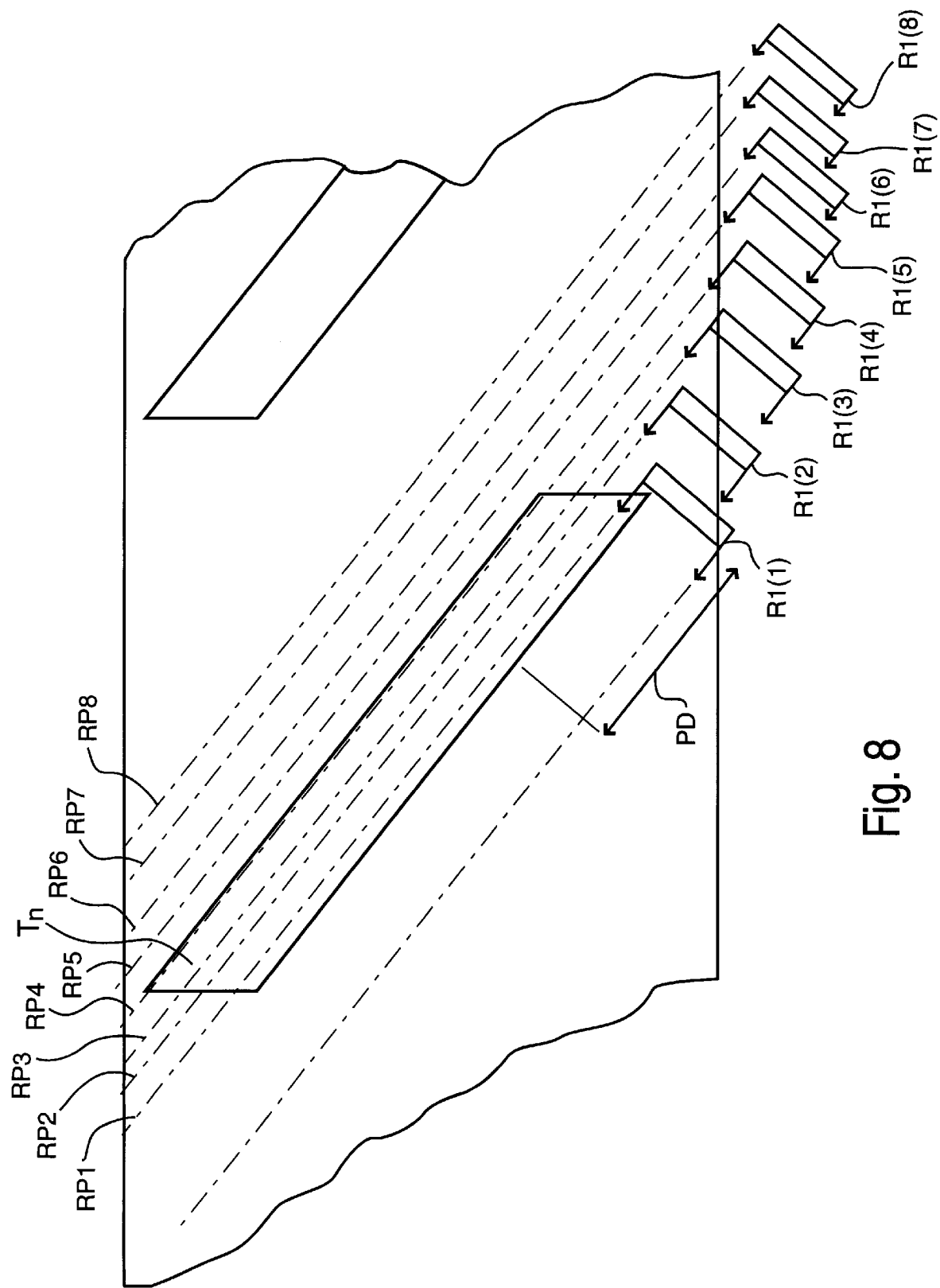
FIG. 8 is a schematic view of a portion of a dual-scan calibration tape, particularly showing differing read head paths traversed with reference to a calibration stripe.

For sake of simplification, FIG. 8 shows only eight differing read paths RP1–RP8 along which read head R1 traverses track $T_n$. To aid illustration, the positions of read head R1 for traversing each of the read paths RP1–RP8 are respectively shown as R1(1)–R1(8) in FIG. 8. How read head R1 acquires the positions R1(1)–R1(8) for traversing the differing paths RP1–RP8 is subsequently explained in connection with two differing modes of the invention.

One example of waveform reading machinery is oscilloscope 100, illustrated in FIG. 6. Oscilloscope 100 has many components, including a peak detector 101, an analog to digital converter (ADC) 102, a triggering circuit 104, a scope controller 106, and a display screen 107. As one example, oscilloscope 100 can be a Tektronix TDS 460A Digital Oscilloscope. The signal voltage waveforms over time for dual-scan master calibration tape 10 herein illustrated are indicative of the signal output by peak detector 101 on line 108. After digital conversion, the signals are applied to a computer 120 over data line 122.

Computer 120 controls the calibration of drive 14. To effect the control, computer 120 is connected by serial line 123 to a serial port of processor 50. The serial port of processor 50 serves as a control status, diagnostic, or monitoring port, and receives signals including signals for coordinating operation of drive 14 with the calibration operation. In addition, computer 120 receives the data on line 122 and a HEAD SYNC triggering signal on line 124 to perform the computations described below.

Figure 2:
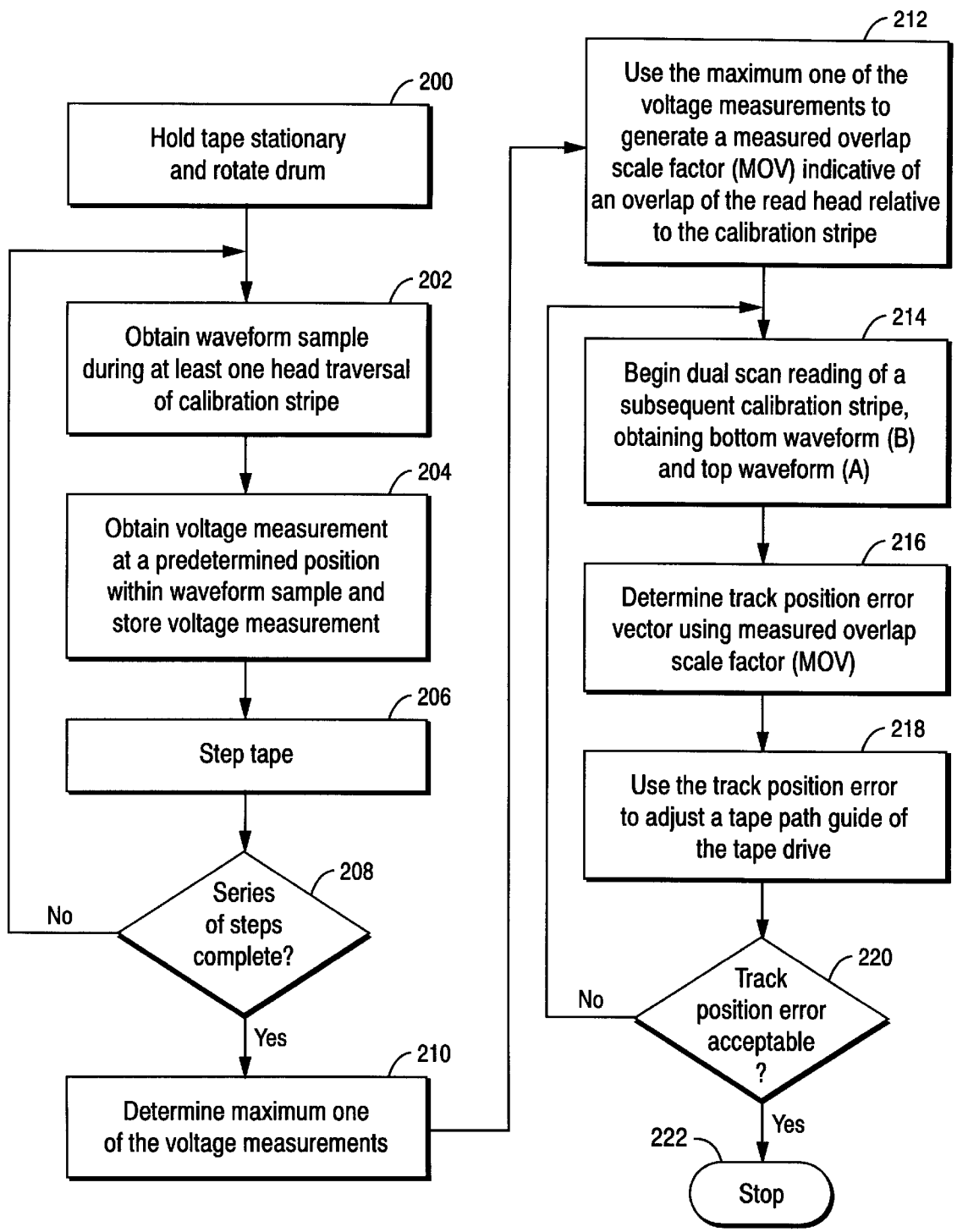
FIG. 2 is a flowchart showing steps of the invention in a mode in which the calibration tape is stationary when traversed by a head and periodically incremented to obtain differing traversal paths.

FIG. 2 shows steps involved in the calibration of tape drive 14 in accordance with a first mode of the invention. In this first mode of the invention, the differing paths of FIG. 8 are realized by periodically stepping the calibration tape in the direction indicated by arrow 31 in FIG. 6. That drive 14 is to enter a calibration operation is communicated to drive processor 50 over line 123 from computer 120, so that drive processor 50 can cooperate with the sequence of steps and events described in FIG. 2.

At step 200 of FIG. 2, calibration tape 10 is held stationary and drum 30 is rotated at its nominal rotational speed. To hold calibration tape 10 stationary, an appropriate signal is sent to transport controller 98, so that take-up reel motor 96 does not enable tape 10 to undergo any linear displacement.

As calibration tape 10 is held stationary (i.e., essentially no linear motion), head R1 repeatedly traverses a first path (e.g., path RP1 in FIG. 8), one path traversal per each rotation of drum 30. During at least one of the traversals of head R1 along path RP1, the signal on line RS from read head R1 is fed to waveform reading machinery, e.g., oscilloscope 100, in order to obtain a waveform sample for path RP1. It should be understood that 30 may rotate many, perhaps a hundred times, while calibration tape 10 is in the position resulting in path RP1. For which particular rotation of drum 30 the signal on line RS is obtained is not critical, but can depend upon constraints and/or considerations relative to capabilities of oscilloscope 100.

Examples of waveforms obtained at step 202 are shown in FIGS. 4A–4H. It will be understood that FIGS. 4A–4H are frames basically depicting an output on display 107 of oscilloscope 100, and that each frame corresponds to a differing one of the paths traversed by read head R1, e.g., FIG. 4A corresponds to read path RP1, FIG. 4B corresponds to read path RP2, and so forth.

Step 204 shows computer 120 obtaining a voltage measurement at a predetermined position within the waveform sample. In the illustrated embodiment, for each waveform sample the voltage measurement is taken at a predetermined time after read head R1 begins to traverse the calibration stripe. For example, with reference to read path RP1, the voltage measurement is taken at a time at which the read head is the predetermined distance PD from the beginning of track $T_n$, (see FIG. 8). For other read paths, the predetermined distance PD is the same.

The beginning of traversal of the calibration stripe is known in drive 14 of FIG. 6 with reference to a signal known as HEAD SYNC which is generated by transport controller 98 and applied on line HS. The signal HEAD SYNC carried on line HS is applied to trigger circuit 104 of oscilloscope 100 for generation of a signal which is acquired and applied on line 124 to computer 120. Generation and the significance of the HEAD SYNC signal is more fully understood with reference to U.S. Pat. No. 5,065,261, entitled "METHOD AND APPARATUS FOR SYNCHRONIZING TIMING SIGNALS FOR HELICAL SCAN RECORDER", which is incorporated herein by reference. Step 204 also involves storing of the voltage measurement taken with respect to the waveform sample.

At step 206 the calibration tape 10 is stepped linearly in the direction of arrow 31 in FIG. 6. In particular, processor 50 issues a step signal to transport controller 98, which results in activating take-up reel motor 96 so that take-up reel 26 is angularly displaced a slight amount, as ascertained from a take-up reel tachometer. In the particular embodiment illustrated, each stepping of calibration tape 10 displaces tape 10 longitudinally by a distance of 21 microns per step.

At step 208, drive processor 50 determines whether the series of steps for calibration tape 10 is complete. In this regard, processor 50 counts each occurrence of stepping at step 208, and upon reaching a predetermined count terminates the stepping operation. In the illustrated embodiment, many steps are utilized as dictated by computer 120, of which only eight steps are shown for sake of simplification in FIG. 8.

After the predetermined count of steps of linear displacement of calibration tape 10 has occurred, at step 210 computer 120 determines a maximum one of the voltage measurements. That is, of the voltage measurements taken and stored at step 204, computer 120 determines which has the greatest magnitude.

Figure 9:
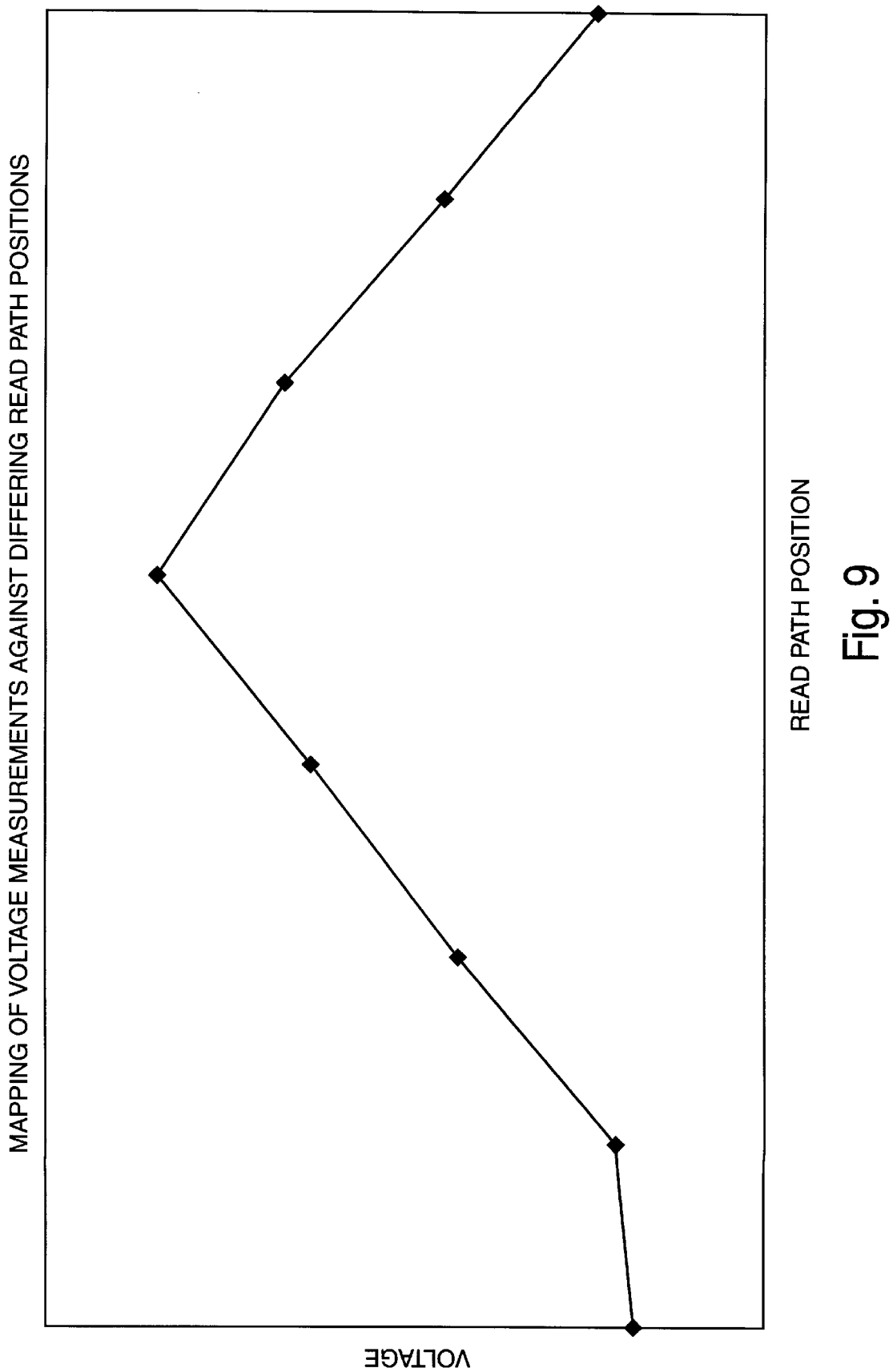
FIG. 9 is graph illustrating a mapping of voltage measurements against the differing read path positions at which the respective voltage measurements were taken.
Figure 10A:
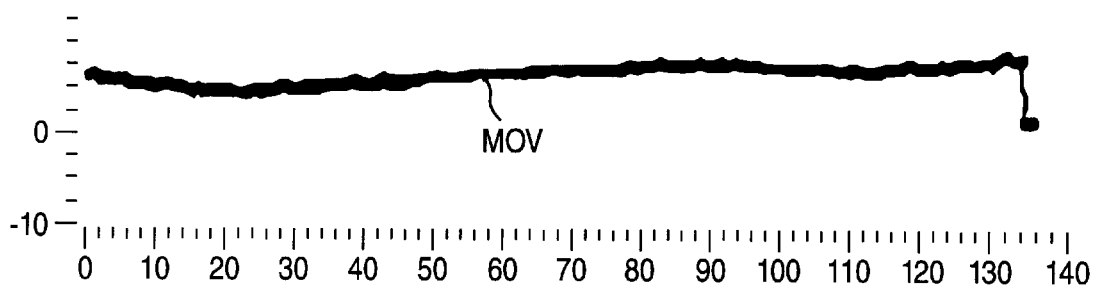
FIG. 10A is a graph showing a measured overlap value waveform obtained in accordance with the present invention.

At step 212, computer 120 utilizes the maximum one of the voltage measurements (determined at step 210) to generate a measured overlap scale factor (MOV) indicative of an overlap of the read head relative to the calibration stripe. FIG. 9 is a mapping of voltage measurements taken at step 204 against the differing read path positions at which the respective voltage measurements were taken. The peak value of the mapping of FIG. 9 is taken as the measured overlap scale factor. In the above regard, FIG. 10A is a graph showing a measured overlap scale factor (MOV) waveform (scaled by microns per volt).

At step 214, computer 120 initiates a dual scan read mode of calibration tape 10. The dual scan read mode is described in detail in U.S. patent application Ser. No. 08/841,579, filed Apr. 30, 1997 by Magnusson, entitled "PREPARATION AND USAGE OF DUAL-SCAN MASTER CALIBRATION TAPE FOR MAGNETIC TAPE DRIVE", which is incorporated herein by reference. In the dual scan read mode, read head R1 scans twice a subsequent calibration stripe, first along its bottom to obtain an "B" waveform and secondly along its top to obtain an "A" waveform. For the bottom and top scans, respective waveform values, known as $A_{meas-voltage}$ and $B_{meas-voltage}$ are obtained.

At step 216, computer 120 determines a track position error vector. The track position error vector E is determined as follows:

$$E = (A_{drive-microns} - B_{drive-microns})/2 \qquad \text{Eqn. 1}$$

where $$A_{drive-microns} = A_{meas-voltage} * (MOV) - A_{precited-microns} \qquad \text{Eqn. 2}$$

and $$B_{drive-microns} = B_{meas-voltage} * (MOV) - B_{precited-microns} \qquad \text{Eqn. 3}$$

In the preceding discussion and equations, E, A and B are understood to be vector quantities.

Thus, as seen above, the computer 120 determines a track position error vector utilizing the measured overlap scale factor (MOV) determined at step 212.

At step 214, computer 120 compares the measured overlap scale factor (MOV) with a predicted overlap value (POV) to determine a track position error (TPE). In other words, at step 212 computer 120 computes the track position error (TPE) by subtracting the predicted overlap value (POV) from the measured overlap scale factor (MOV), i.e., TPE=MOV–POV.

The predicted vectors $A_{precited-microns}$ and $B_{precited-microns}$ are predictions as to how a perfectly aligned (e.g., perfectly calibrated) drive would read the calibration tape 10. The person skilled in the art knows how to obtain such predicted vectors, for example with resort to microscope Bitter pattern track straightness measurements.

Figure 10B:
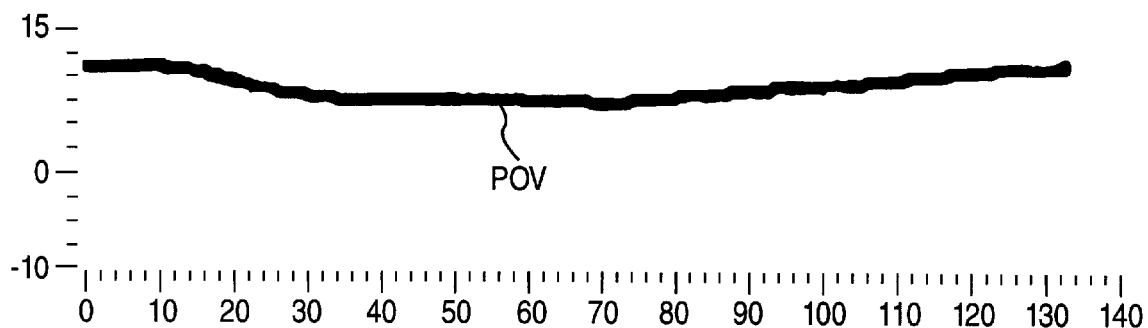
FIG. 10B is a graph showing a predicted overlap value from a microscope stage measurement model.
Figure 10C:
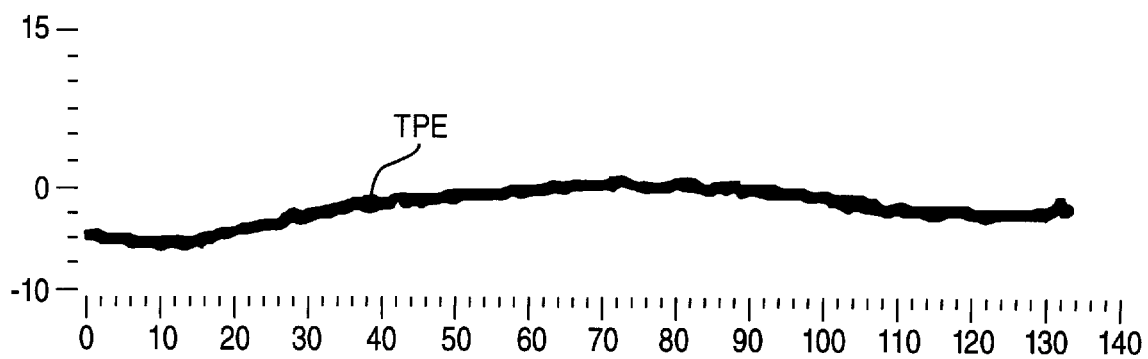
FIG. 10C is a graph showing a track position error obtained in accordance with the present invention.

In the above regard, FIG. 10B is a graph showing a representative predicted overlap value (POV) from a microscope stage measurement model. FIG. 10C is a graph showing the resultant substraction of the predicted overlap value (POV) from the measured overlap scale factor (MOV) to obtain the track position error (TPE).

Figure 7B:
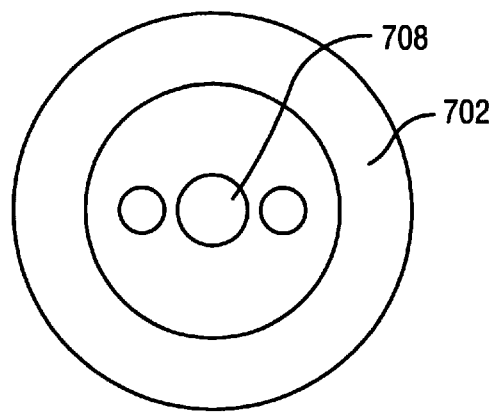
FIG. 7B is a top view of the guide element of FIG. 7A.
Figure 7A:
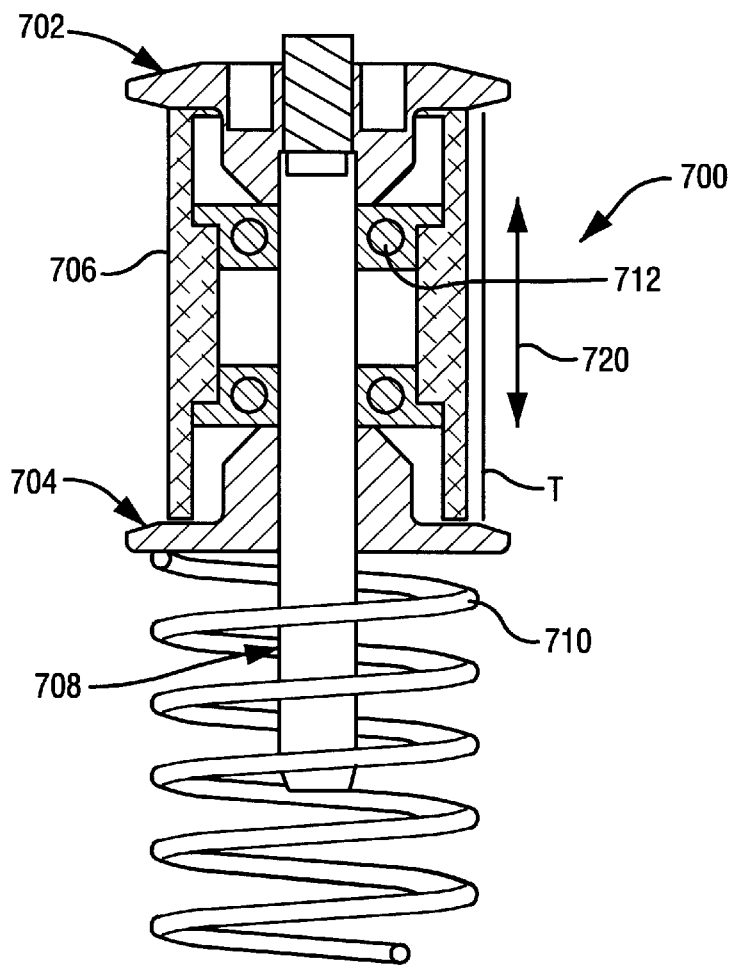
FIG. 7A is a cross-sectional side view of a guide element for a tape drive.

At step 218 the track position error vector (TPE) is used to adjust a tape path guide (see FIGS. 7A and 7B) of the tape drive. The track position error vector (TPE) provides an indication (in microns) of track straightness. The person skilled in the art, with the use of the oscilloscope display 107 and aided by the track position error (TPE) computed at step 214, knows how to adjust the tape path guides to achieve a better (i.e., acceptable) value of the track position error (TPE).

At step 220 a determination is made whether the track position error vector is acceptable. If not, execution continues by returning to step 214 whereat another calibration stripe on tape 10 is read and thereafter steps 216–218 repeated. In returning to step 214, it should be understood that the next calibration stripe read from tape 10 may not necessarily be the very next physical calibration stripe on the tape. Steps 214 through 220 may be repetitively executed, reading a differing subsequent calibration stripe during execution, until an acceptable track position error vector is achieved. On the other hand, if, at step 220, the track position error vector is acceptable, the calibration is concluded as indicated by step 222.

Figure 3:
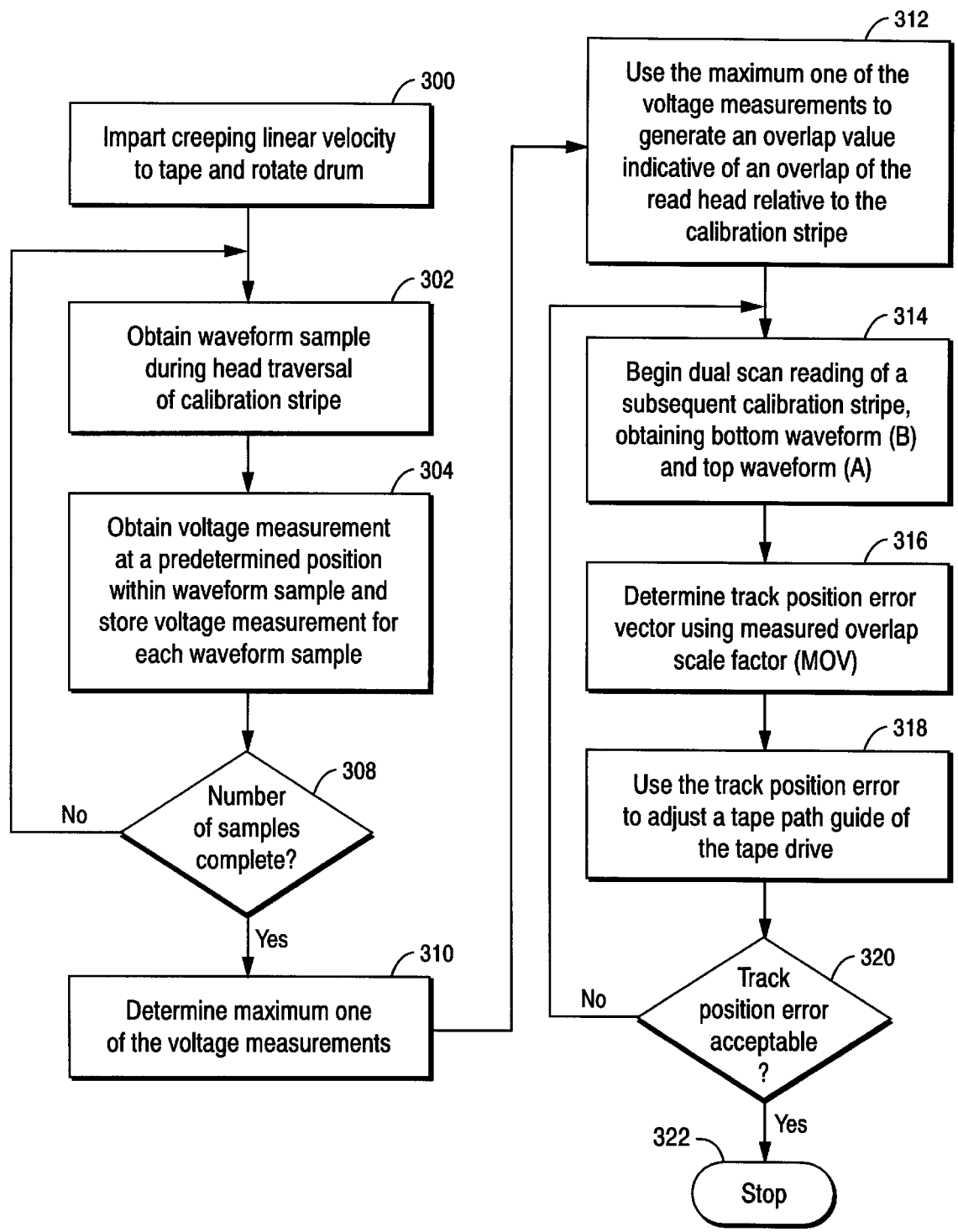
FIG. 3 is a flowchart showing steps of the invention in a mode in which the calibration tape has a creeping linear velocity to obtain differing traversal paths.
Figure 4D:
FIG. 4A–FIG. 4H are a series of frames showing a series of waveforms acquired as a head traverses differing paths over a calibration stripe in accordance with the present invention.
Figure 4H:
Figure 4C:
Figure 4G:
Figure 4B:
Figure 4F:
Figure 4A:
Figure 4E:

FIG. 3 shows steps involved in the calibration of tape drive 14 in accordance with a second mode of the invention. In this second mode of the invention, the differing paths of FIG. 8 are realized by slow, e.g., continuous creeping, linear movement of calibration tape 10 in the direction indicated by arrow 31 in FIG. 6. Again, that drive 14 is to enter a calibration operation is communicated to drive processor 50 by a signal on line 123 from computer 120, so that drive processor 50 can cooperate with the sequence of steps and events described in FIG. 3.

At step 300 of FIG. 3, calibration tape 10 is slowly displaced and drum 30 is rotated at its nominal rotational speed. The displacement of calibration tape 10 is much slower than the nominal linear velocity of tape in drive 14. For example, for this second mode the linear displacement of calibration tape 10 is approximately 33 microns per second. To impart such a slow linear velocity to calibration tape 10, an appropriate signal is sent to transport controller 98, so that take-up reel motor 96 displaces tape 10 at the prescribed slow rate.

The remaining steps of FIG. 3 are understood from steps of FIG. 2 which have reference numerals of similar tens and ones digits. In the mode of FIG. 3, however, calibration tape 10 is not stepped, but slowly displaced linearly until a predetermined number of samples (step 308) is obtained. Thereafter, the actions and calculations performed by computer 120 are essentially identical to those performed for the mode described in FIG. 2.

The present invention provides an improved process for the adjustment and alignment of any tape drive using a rotary scanning head device (e.g., helical, transverse, or arcuate) for magnetic recording. This improved process has increased sensitivity and reduces the influence of head/tape contact effects, thereby improving the accuracy of the tape drive alignment which is based on readback signal amplitudes.

While the invention has been particularly shown and described with reference to the preferred embodiments thereof, it will be understood by those skilled in the art that various alterations in form and detail may be made therein without departing from the spirit and scope of the invention.

The embodiments of the invention in which an exclusive property or privilege is claimed are defined as follows:

1. A method of calibrating a helical scan magnetic tape drive, the method comprising:
   (1) loading a calibration tape into a tape path of the helical scan drive, the calibration tape having a calibration stripe recorded thereon;
   (2) obtaining a series of calibration signal waveforms from the calibration stripe as a head traverses differing paths along the calibration stripe, the differing paths occurring at differing linear positions of the calibration tape relative to the head;
   (3) for each calibration signal waveform in the series, obtaining a voltage measurement at a predetermined position within each waveform;
   (4) determining a maximum one of the voltage measurements obtained in step (3); and,
   (5) using a selected one of the voltage measurements to generate a measured overlap scaling factor indicative of an overlap of the read head relative to the calibration stripe.

2. The method of claim 1, further comprising using the measured overlap scaling factor to obtain a track position error vector.

3. The method of claim 2, further comprising using the track position error vector to adjust a tape path guide of the tape drive.

4. The method of claim 1, wherein the selected one of the voltage measurements is a maximum one of the voltage measurements.

5. A method of calibrating a helical scan magnetic tape drive, the method comprising:
   (1) loading a calibration tape into a tape path of the helical scan drive, the calibration tape having a calibration stripe recorded thereon;
   (2) using a read head to obtain a calibration signal waveform from the calibration stripe while the calibration tape has essentially no linear velocity in the tape drive;
   (3) stepping the calibration tape a predetermined distance in a linear direction in the tape path, and then repeating step (2) to obtain another calibration signal waveform;
   (4) repeating step (3) a plurality of times in order to obtain a series of calibration signal waveforms;
   (5) for each calibration signal waveform in the series, obtaining a voltage measurement at a predetermined position within each waveform;
   (6) determining a maximum one of the voltage measurements obtained in step (5); and,
   (7) using the maximum one of the voltage measurements to generate a measured overlap scaling factor indicative of an overlap of the read head relative to the calibration stripe.

6. The method of claim 5, further comprising using the measured overlap value to obtain a track position error vector.

7. The method of claim 6, further comprising using the track position error vector to adjust a tape path guide of the tape drive.

8. The method of claim 5, wherein the predetermined distance at which the calibration tape is stepped a same distance for all read paths.

9. The method of claim 5, wherein the predetermined position within each waveform at which the voltage measurement is obtained is determined with reference to a time at which the head crosses a beginning of the calibration stripe.

10. A method of calibrating a helical scan magnetic tape drive, the method comprising:
  (1) loading a calibration tape into a tape path of the helical scan drive, the calibration tape having a calibration stripe recorded thereon;
  (2) imparting a slow creeping linear velocity to the calibration tape;
  (3) using a read head to obtain a calibration signal waveform from the calibration stripe while the calibration tape moves at the slow creeping linear velocity;
  (4) periodically repeating step (3) to obtain a series of calibration signal waveforms;
  (5) for each calibration signal waveform in the series, obtaining a voltage measurement at a predetermined position within each waveform;
  (6) determining a maximum one of the voltage measurements obtained in step (5); and,
  (7) using the maximum one of the voltage measurements to generate a measured overlap scaling factor indicative of an overlap of the read head relative to the calibration stripe.

11. The method of claim 10, further comprising using the measured overlap value to obtain a track position error vector.

12. The method of claim 11, further comprising using the track position error vector to adjust a tape path guide of the tape drive.

13. The method of claim 10, wherein the predetermined position within each waveform at which the voltage measurement is obtained is determined with reference to a time at which the head crosses a beginning of the calibration stripe.

* * * * *